United States Patent [19]

Dorfman

[11] Patent Number: 5,623,258
[45] Date of Patent: Apr. 22, 1997

[54] MULTI-STATION DATA CAPTURE SYSTEM

[76] Inventor: Bertrand Dorfman, 444 E. 82nd St.-Apartment 7B, New York, N.Y. 10028

[21] Appl. No.: 376,689

[22] Filed: Jan. 23, 1995

Related U.S. Application Data

[63] Continuation of Ser. No. 480, Jan. 5, 1993, abandoned.

[51] Int. Cl.[6] .............................. G07C 1/20; G08B 25/10; G06K 5/00
[52] U.S. Cl. .................. 340/825.08; 340/825.34; 340/286.06; 340/306; 235/382
[58] Field of Search .................... 340/286.01, 286.02, 340/825.34, 825.08, 306, 286.06, 287, 309.15, 825.02, 825.31; 235/380, 382, 382.5; 379/49

[56] References Cited

U.S. PATENT DOCUMENTS

| | | | |
|---|---|---|---|
| 3,418,650 | 12/1968 | Rich et al. | 340/286.02 |
| 3,736,561 | 5/1973 | Rumpel | 340/286.02 |
| 3,757,089 | 9/1973 | Hockler | 340/825.31 |
| 3,990,067 | 11/1976 | Van Dusen et al. | 340/286.01 |
| 4,575,622 | 3/1986 | Pellegrini | 235/382 |
| 4,638,313 | 1/1987 | Sherwood, Jr. et al. | 340/825.08 |
| 4,801,786 | 1/1989 | Stobbe | 340/306 |
| 4,817,115 | 3/1989 | Campo et al. | |
| 4,857,883 | 8/1989 | Mama | 340/306 |
| 4,926,464 | 5/1990 | Schley-May | |
| 4,939,352 | 7/1990 | Sunyich | 235/382 |
| 4,967,195 | 10/1990 | Shipley | 340/825.08 |
| 5,339,339 | 8/1994 | Petitclerc et al. | 340/306 |

OTHER PUBLICATIONS

Petersen, R.; "Hasler Personnel Protection Systems"; *Hasler Reviews*; vol. 14, No. 4; Winter 1981.

*Primary Examiner*—Larry D. Donaghue
*Assistant Examiner*—Mark H. Rinehart
*Attorney, Agent, or Firm*—McAulay Fisher Nissen Goldberg & Kiel, LLP

[57] ABSTRACT

A system for monitoring the tour that a guard must undertake in each building of a large number of building sites involves an arrangement in which a system control center has a two-way communication by telephone network with each of a large number of building sites. Within each building, a building site unit has a two-way communication by broadcast with a large number of tour station units. A guard with a guard identification card checks in through a card reader at each tour station unit. A unique tour station unit identification number is associated with the guard identification number and transmitted to the building site unit where it is associated with a time and date and transmitted to the system control center. In this fashion, a large number of sites and a larger number of tour station units can all be monitored on close to a real time basis. A defective tour station unit can readily be replaced with a standard unit available at each building site. Under control of data transmitted from the system control center. A PROM at the tour station unit can be programmed to provide the appropriate tour station unit code number.

14 Claims, 6 Drawing Sheets

MULTI-STATION DATA CAPTURE SYSTEM

REFERENCE TO RELATED APPLICATIONS

This application is a continuation of application Ser. No. 08/000,480 filed Jan. 5, 1993 and now abandoned.

BACKGROUND OF THE INVENTION

This invention relates in general to a system for assuring that guards or other personnel check in at each of multiple stations in each of a variety of different building sites. The system identifies the individual who checks in at the station and the time of the check in.

A typical situation to which this invention is addressed is one where an empty building or a building at night time requires that an individual, usually a guard, make predetermined rounds and check in at each of a number of different stations placed throughout the building. Problems arise in administering such a situation particularly where there are large numbers of guards and large numbers of buildings involved. Known techniques of having a clock punched at each station tend to result in large amounts of punched in data being accumulated on site for ultimate review. However, the review tends to be less thorough when the review occurs at a later date. Accordingly, there is a need for a system in which a failure to punch in on a given station at a given time can be more readily detected on something close to a real time basis.

Another problem that arises is that the station clocks which have to be punched in tend to get damaged, intentionally or unintentionally, and it often becomes difficult to assess the diligence of the guard in making the rounds.

It is important that data be collected on a reliable basis to verify that a guard has in fact checked in at each of the stations assigned and to verify the time when such occurs. Assurance that this validation is reliably made enhances the functioning of the system. It causes the individuals involved to recognize the value and significance of making sure that the rounds are properly made.

Accordingly, the primary object of this invention is to provide an enhanced multi-station time capture system which will operate on a reliable and assured basis.

It is a further purpose of this invention to enhance that reliability and assurance by obviating the lapses that can occur if the equipment at any punch-in station is defective.

It is a further purpose of this invention to provide a system which can readily interface with and incorporate the payroll and invoicing requirements.

It is also important that the headquarters location for a system be able to automatically and regularly check on the operability of the equipment at each of the stations where a guard on tour has to punch in. Accordingly, it is another purpose of this invention to provide a system which facilitates such headquarters polling of the operability of all tour stations in the system.

BRIEF DESCRIPTION OF THE INVENTION

In brief, this invention ties the punch-in occurrences at each of a number of tour stations in each of a number of building sites to a system control center.

A broadcast transceiver is included in a tour station unit located at each station of each building site. Each tour station unit has a card reader to receive and read a personnel identification card. Each tour station within the building site has its own specific identification code. The identification code for the station is associated with the identification code for the card being read by the tour station unit and that association of personnel code and station code is broadcast to a transceiver in a building site unit. Thus the critical data connecting a personnel identification code to a station identification code is immediately transmitted by broadcast to a building site unit where clock information is added so that time and date are coupled to these two identification codes.

These three associated items of data are then stored at the building site unit. On a predetermined periodic basis, or when appropriately polled, this data is transmitted over the telephone network to the system control center.

Each tour station unit is substantially identical and includes a transceiver so that it can receive as well as transmit. This reception capacity is important to permit polling the unit to determine its operability and to permit remotely generating a tour station identification code which can be written into the transceiver.

The system control center regularly polls all tour station units, through the building site unit, to determine operability. If a tour station unit is defective, a phone call is made to the guard at the building site instructing him or her to replace the defective tour station unit with one of the standard replacement units kept on site. After replacement, the system control center transmits the tour station code to the replacement unit where a PROM is appropriately encoded with the transmitted tour station code.

BRIEF DESCRIPTION OF THE FIGURES

FIG. 4 shows the coupling between a tour station unit and a building site unit by means of a broadcast transceiver.

DESCRIPTION OF THE PREFERRED EMBODIMENTS

The FIGS. are block diagrams illustrating the components of one embodiment of the system in this invention.

Figure 1:
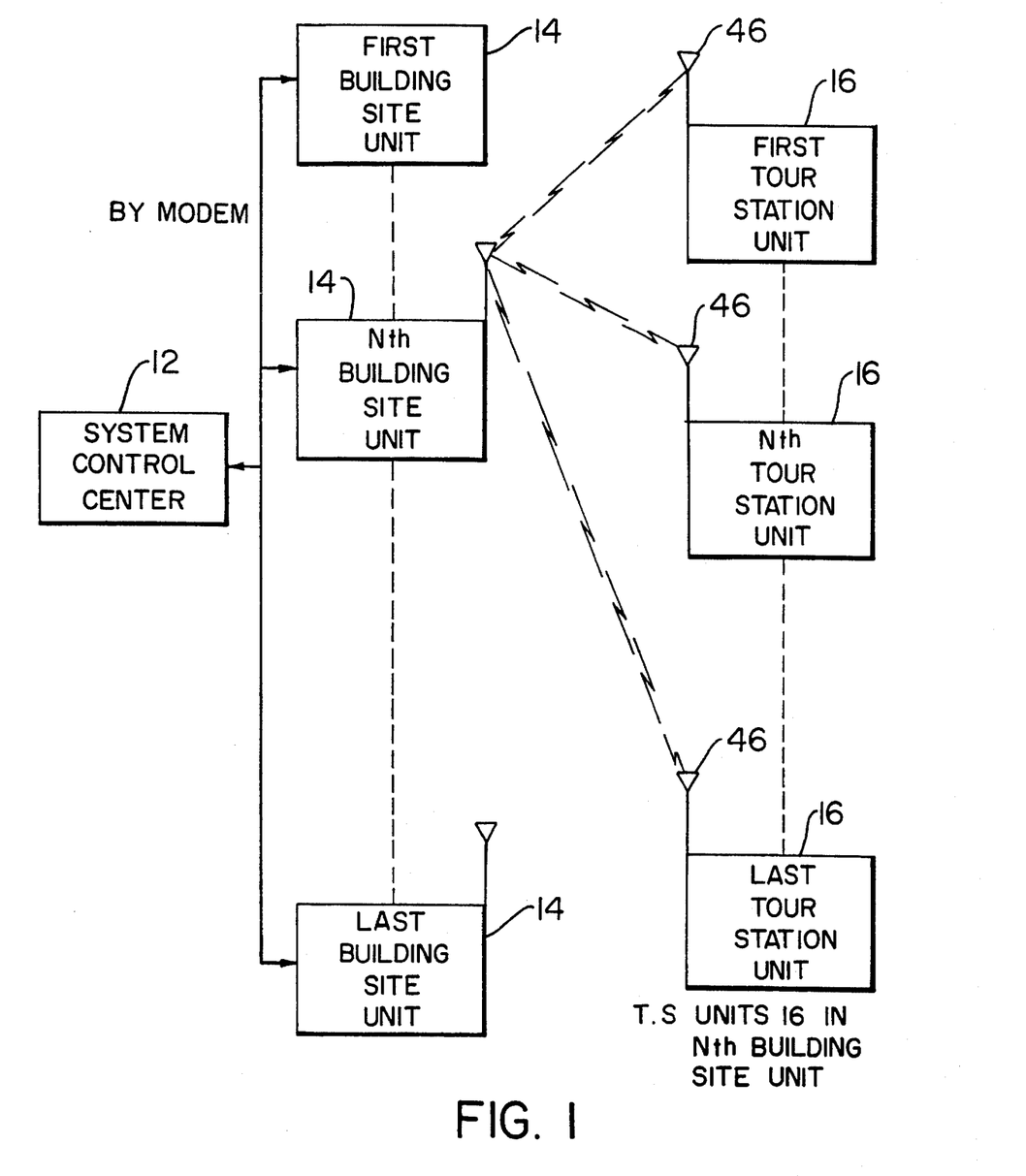
FIG. 1 is a block diagram of the system of this invention.

As shown in FIG. 1, a system control center 12 communicates with a large number of building site units 14 by modem.

The modem provides a two way communication to permit building site data to be sent to the system control center 12 and to permit the control center 12 to poll and interrogate each building site unit 14.

At each building site, two way broadcast communication is had between the building site unit 14 and each of a substantial number of tour station units 16. This permits status checking of each tour station unit 16 and permits tour station unit data to be sent to the building site unit 16.

Figure 2:
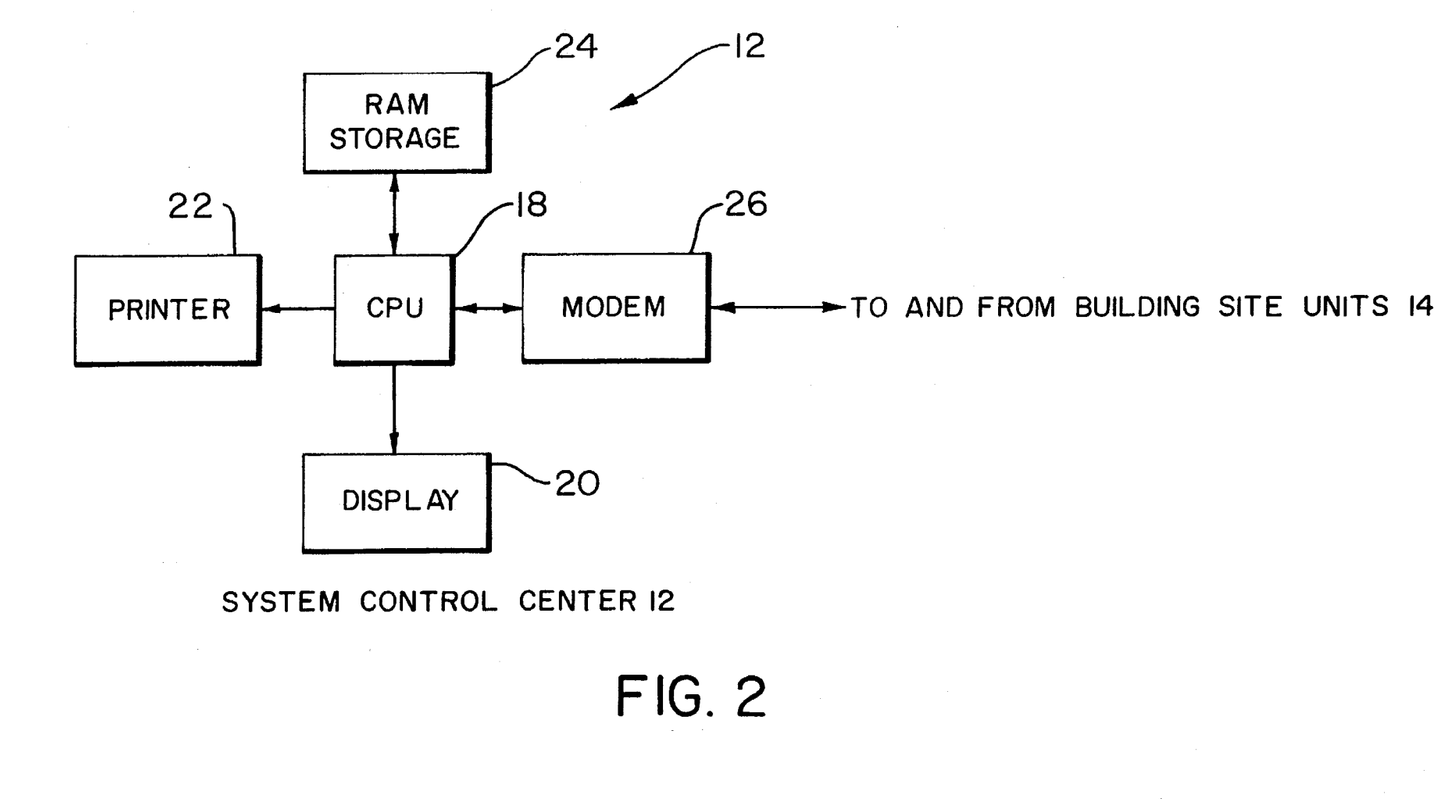
FIG. 2 is a block diagram of the system control center of FIG. 1.

As shown in FIG. 2, the system control center 12 includes a central processing unit 18 which performs the control functions and data processing functions necessary at the system control center 12. A display 20 and printer 22 provide the desired data for viewing and use by personnel at the system control center 12. A RAM storage 24 enables storage of data received from various building sites. A modem 26 is the means by which the CPU 18 communicates to each of a large number of building site units 14 and the means by which data from the various building site units 14 and the tour station units 16 is received.

Figure 3:
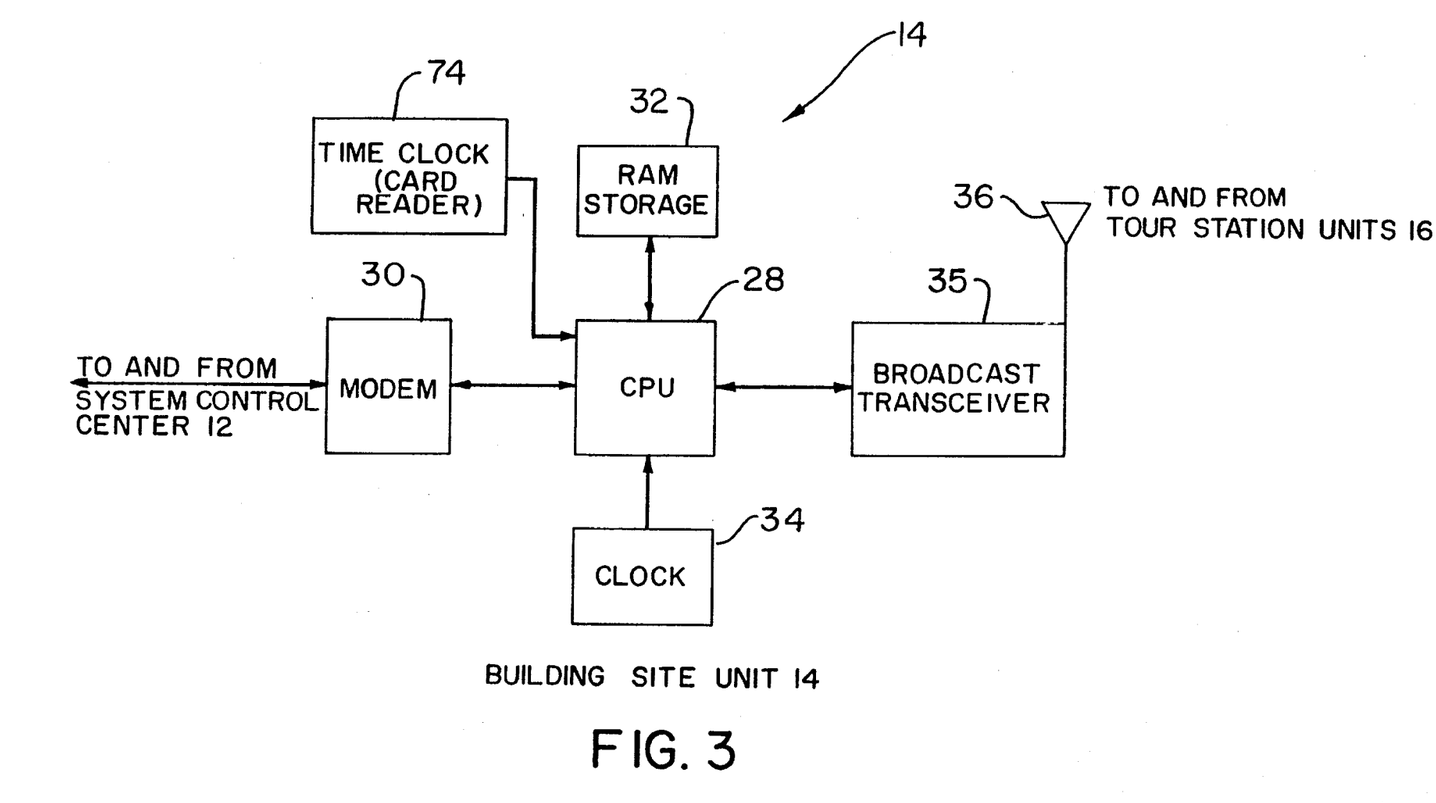
FIG. 3 is a block diagram of one of a number of building site units showing its coupling to the system control center through a modem and its coupling to tour station units within the building by a broadcast transceiver.

As shown in FIG. 3, each building site unit 14 includes a central processing unit 28 which handles the function at each building site unit for processing data. The modem 30 provides communication to and from the system control center 12. A RAM storage 32 permits storing the data received from each tour station unit 16 until it is to be transmitted to the system control center 12. A clock 34 provides date and time information on a continuing basis which is coupled to the tour station unit 16 information when it is placed into storage 32 so that appropriate date and time information can be transmitted to the system control center 12 with the appropriate tour station unit data. A broadcast transceiver 35 is used to transmit to and receive data over antenna 36 from each of the many tour station units 16 at each building site.

Figure 4:
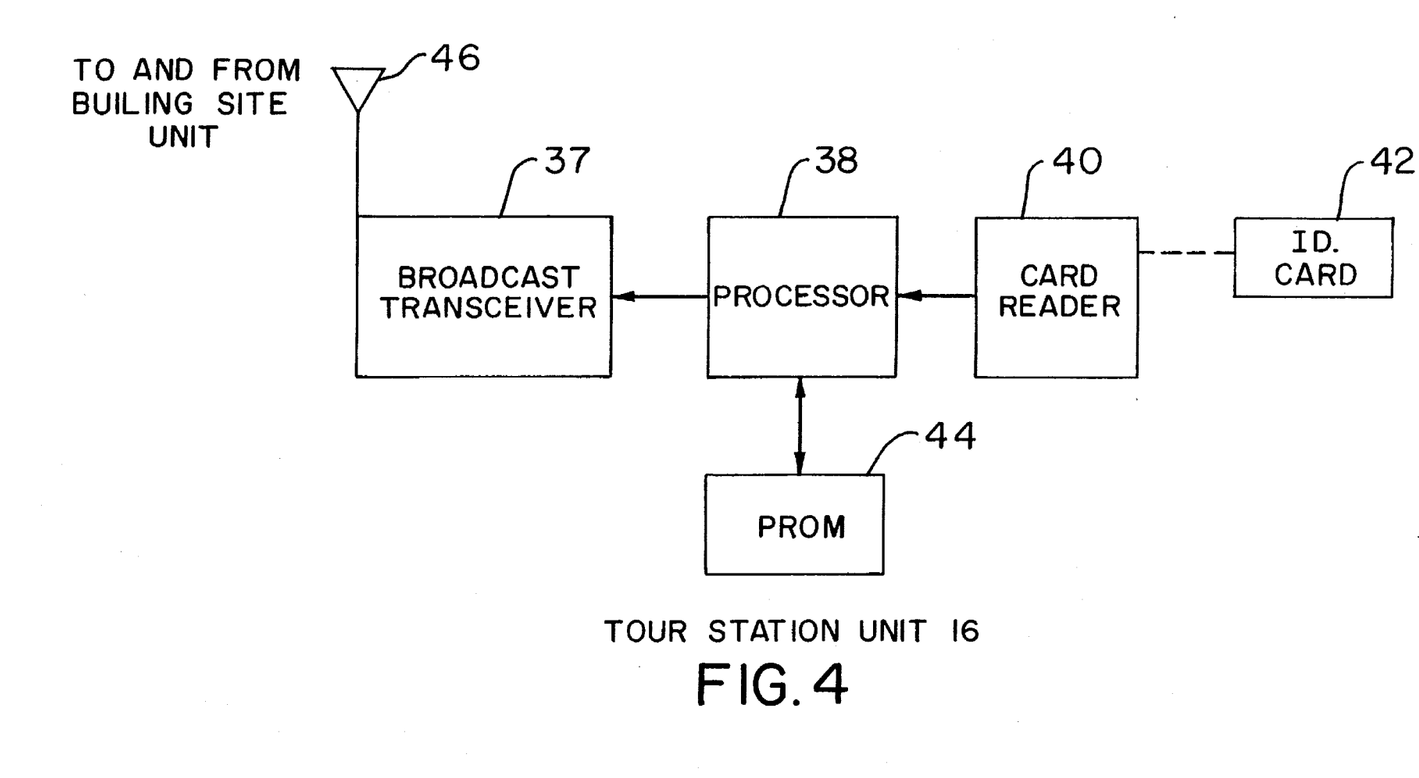
FIG. 4 is a block diagram of one of a number of tour station units which are in each building having a building site unit.

As shown in FIG. 4, each tour station unit 16 includes a broadcast transceiver 37 which provides for communication of information between the tour station unit 16 and the building site unit 14. A central processing unit 38 provides the data handling functions necessary at each tour station unit 16. A card reader 40 is adapted to read individual guard identification information from any guard card 42 that is passed through the card reader 40. The PROM 44 (programmable read only memory) provides the tour station identification number. When the card reader 40 reads a guard I.D. card 42, that information is associated with the tour station identification number from the PROM 44 and the CPU 38 and that associated data is immediately broadcast from the transceiver 36 over the antenna 46 to the broadcast transceiver 34 at the associated building site unit.

At the building site unit 14, the guard identification number and associated tour station unit number is combined with the date and time information on the clock 34 through the CPU 28 and placed in RAM storage 32. When polled by the system control center 12, the building site unit 14 transmits a plurality of sets of these three associated items of information over the telephone network through the modems 30 and 26 to the CPU 18 at the system control center 12 where that data is placed in RAM storage 24 and can be called up at anytime. It can be viewed on the display 20 and/or provided as hard copy information by the printer 22.

If a tour station unit 16 is defective, the guard can readily replace the unit 16 with one of a number of standard units 16 held at the building site. The procedure is that system control center 12 on a regular predetermined basis polls all tour station units 16 to determine their operability. This polling is done by modem to the building site and by broadcast from the building station unit 14 to the tour station unit 16. If a tour station unit 16 is defective, a phone call is placed to the guard who is told which unit to replace. After that replacement is made, the system control center 12 transmits an appropriate message which carries that tour station's unique identification code by modem to the building site unit 14 which then broadcasts to the tour station unit 16. The CPU 38 programs the PROM 44 with the unique identification number for that tour station 16.

More particularly, a new tour station unit 16 has no identification number assigned to it prior to installation. It will require a unique one time message from the system control center 12 through the associated building site unit 14 to provide its unique identification number. A new tour station unit 16 is programmed to transmit a message indicating that it does not have an assigned identification number. It transmits that message during a time slot in the system polling sequence that is reserved for that purpose. The system control center 12 then responds by transmitting a message containing that unique identification number. The message, however can only be decoded by the new tour station unit because tour station units contain PROM units which write once, read many times. Since this message will only be accepted by the new tour station unit 16, it will be received and decoded by that new tour station unit 16. The message will contain instructions for setting up the new tour station unit 16 with the same identification number as the one it replaces.

Thus the polling provides a sequential identification of each tour station unit 16 in this system and when a tour station unit fails to be identified and thus is presumably defective, the system control center can transmit an appropriate message to the guard on site to replace the defective tour station unit 16. That polling sequence includes a time slot that permits this transmission of information to the control center that a new unit has been installed so that the control center can then in response to receiving that message transmit the appropriate identification number having confirmed by virtue of receipt of this message that the new tour station unit is in place.

A presently preferred mode of effecting the broadcast transmission between each building site unit 14 and the associated tour station unit 16 associated with the building is a spread-spectrum technique broadcast within the building.

A frequency hopping spread spectrum technique would provide for a first predetermined set of frequencies for transmission from building site unit 14 to associated tour station units 16 and a second predetermined set of frequencies for transmission from tour station units 16 within a building to the associated building site unit 14.

Figure 5:
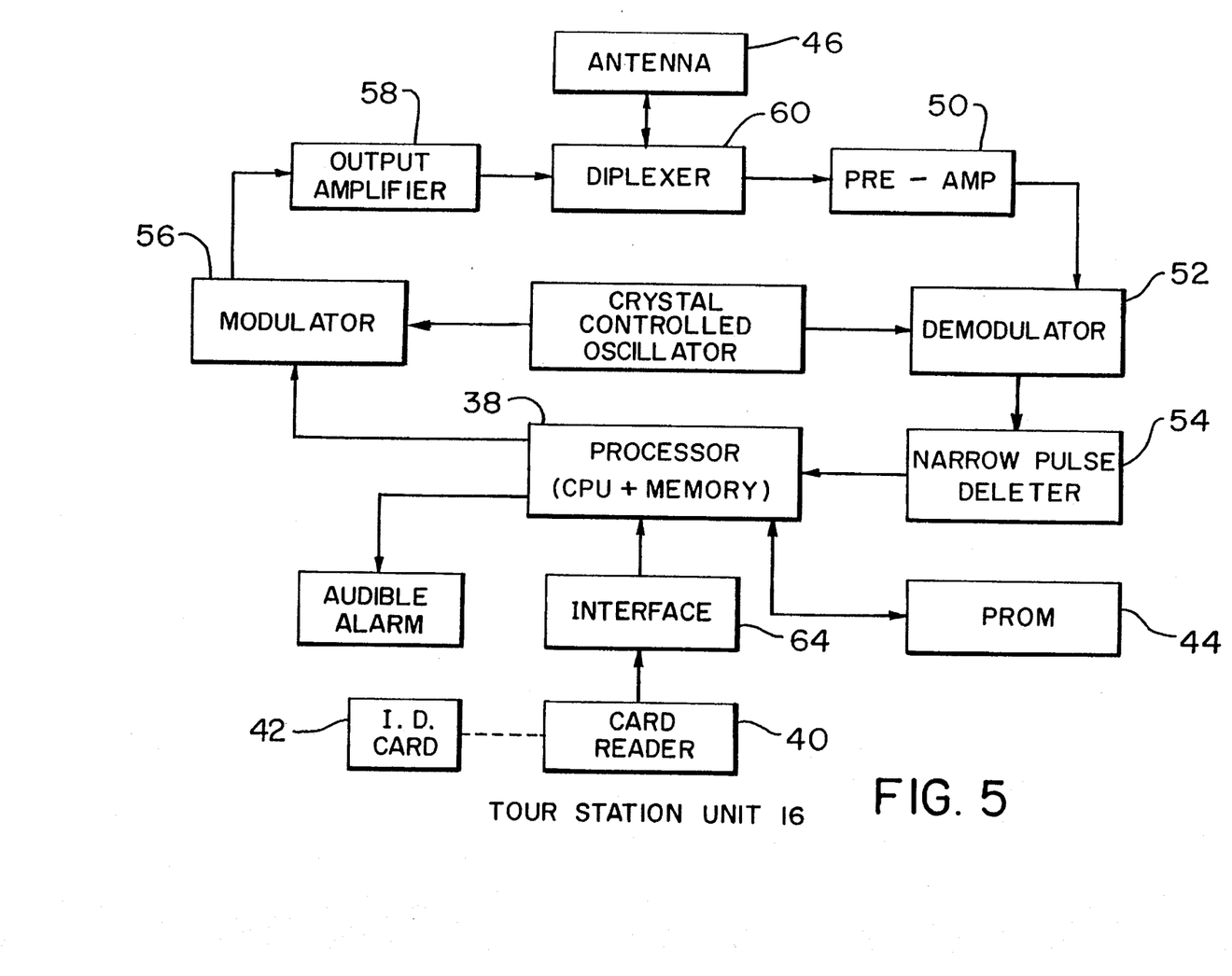
FIG. 5 is a block diagram in somewhat greater detail of the tour station unit including circuitry to delete electrical spikes from the data pulse train.

FIG. 5 illustrates the FIG. 4 tour station unit 16 in somewhat greater detail. The antenna 46 provides both transmission of broadcast information from the unit 16 as well as receipt of broadcast information to the unit 16. The reception component of the transceiver 37 includes a low noise pre-amplifier 50, a demodulator 52 and a narrow pulse deleter 54. The transmission component of the transceiver 37 includes a modulator 56 and a relatively higher power output amplifier 58. A diplexer 60 protects the receiving segment of the transceiver from signals generated by the transmitting segment.

The processor 38, which includes a central processing unit and memory, receives personal identification code information through a card reader 40 which may have to employ an interface 64 in order to provide the data to the processor 38 in the form required by the processor 38. The card reader information coupled with the tour station unit identification code from the PROM 44 is applied to the modulator 56 and amplified by amplifier 58 for transmission over the antenna 46 to the building site unit 14.

A narrow pulse deleter 54 is required to eliminate noise spikes. Such a narrow pulse deleter is shown in block diagram form in FIG. 6.

Figure 6:
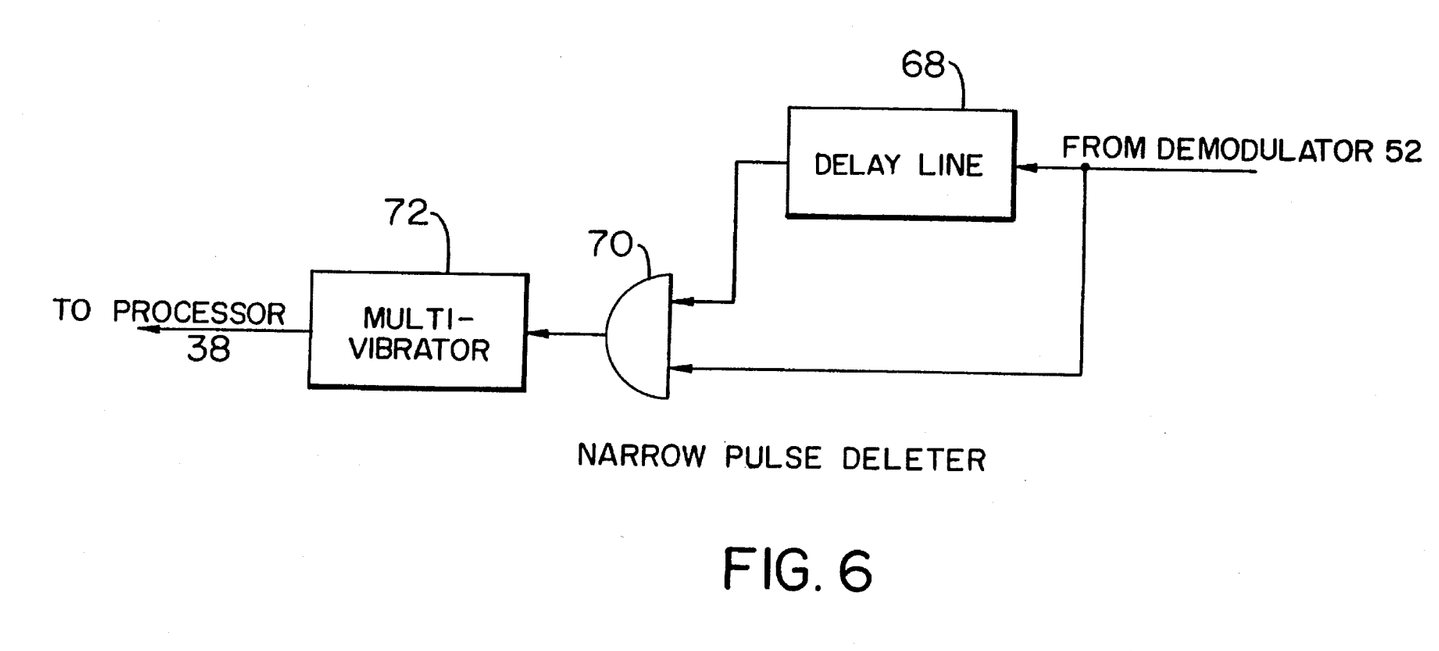
FIG. 6 is a more detailed showing of the circuitry to distinguish electrical spikes from data pulses that is employed in a preferred embodiment of the system of this invention.

If a noise spike has sufficient amplitude to be interpreted by the demodulator 52 as a digital bit, it would normally be applied as data to the processor 38. However, the pulse width of a noise spike is normally substantially less than the pulse width of the narrowest valid bit. The narrow pulse deleter 54 will block that invalid bit from being applied to the processor 38. The delay line 68 is made equal to just under the minimum pulse width of a valid digital bit. If the input pulse is of sufficient width to be present at the input and output of the delay line 68 simultaneously, then that pulse is a valid digital bit. The presence of a signal at the input of the delay line simultaneous with the output of the delay line provides a simultaneous signal to the two inputs to the AND gate 70 which results in an output from the AND gate 70. The output then triggers a single shot multi-vibrator 72 which generates a valid bit signal that is applied to the processor 38. However, if the signal from the demodulator 52 is too narrow to cause simultaneous inputs to the AND gate 70, there will be no output from that AND gate and that pulse from the demodulator 52 is effectively suppressed or deleted from the signals applied to the processor.

In one embodiment, the narrowest valid bit is used to designate the leading and trailing edge of a pulse in a pulse width modulation system.

It should be understood that there are many modifications that can be made in this system by one skilled in the art. The system provides for a great deal of flexibility. For example, the information provided with the date and time that is associated with a guard's identification number provides information that can be used for payroll purposes.

In addition, a standard time clock 74 can be associated with the CPU 28 at each building site unit 14 so that clock-in information for payroll purposes can be transmitted to the system control center 12.

Although it is contemplated that the preferred system would provide information from each building site unit when the building site unit is polled, a system can be configured so that the building site units will transmit information on a predetermined preprogrammed basis.

Since the system permits redundant transmission of information to minimize error, the CPU 38 should have enough RAM storage so that data transmitted from the tour station 16 can be redundantly transmitted.

It might also be noted that the system control center 12 could be any one of a number of separate regional control centers all of which, in turn, would be tied together through the telephone network to a single central control center. Such further pyramiding of the arrangement shown can obviously readily be accomplished.

What is claimed is:

1. A multi-station, multiple building personnel tour supervision and verification system comprising:

a system control center, a plurality of building site units, one of said units being located at each of a plurality of building sites, a plurality of tour station units at each of said sites, each of said tour station units including a first memory for retaining an individual tour station identification code, each of said tour station units at a building site being substantially interchangeable except for said tour station identification code, each of said tour station units being mounted for ready replacement, a plurality of personnel identification passive element cards, each of said cards having a separate personnel identification code, each of said tour station units including a card reader and a first transceiver, said first transceiver being a radio broadcast transceiver, said card reader adapted to receive any of said personnel identification cards and to read said personnel identification code on the card received, each of said building site units including a second transceiver, said second transceiver being a radio broadcast transceiver adapted to communicate with each of said first transceivers at the associated building site, each of said first transceivers being coupled to a separate one of said card readers to transmit information including said personnel identification code in association with said tour station identification code to the one of said second transceivers at the associated one of said building site units, each of said building site units including a storage unit to store said information transmitted from each of said first transceivers in the associated building, each of said building site units including a third transceiver, said third transceiver being adapted to transmit said information stored in said storage unit, a fourth transceiver at said system control, said fourth transceiver adapted to communicate with each of said third transceivers at each of said building site units to receive transmissions from each of said building site units of said stored information, each of said tour station units being responsive to a polling signal transmitted to said first transceiver to provide an indication of tour station operability, each of said tour station units having a write element to write a station identification code in said first memory at said tour station unit, said building site units responding to receipt of a tour station code transmitted from said system control unit to retransmit said tour station identification code to said write element at an uncoded tour station unit, replacement of a defective one of said tour station units with an uncoded tour station unit permitting writing of a tour station identification code into said uncoded tour station unit under control of said system control center.

2. The multi-station system of claim 1 wherein: each of said tour station units is battery operated.

3. The multi-station system of claim 1 wherein: said first memory at each of said tour station units is a PROM.

4. The multi-station system of claim 1 wherein: each of said building site units transmits to said system control center in response to a polling signal received at said third transceiver from said system control center.

5. The multi-station system of claim 1 wherein: each of said building site units transmits to said system control center from said third transceiver on a predetermined periodic basis.

6. The multi-station system of claim 1 wherein: said third and fourth transceivers are modem units.

7. The multi-station system of claim 1 further comprising:

clock means at said building site units to provide a date and time signal.

said storage unit at each of said building site units providing said date and time signal as part of said stored information together with the associated personnel and tour station codes.

8. The multi-station system of claim 7 wherein: each of said building site units transmits to said system control center in response to a polling signal received at said third transceiver from said system control center.

9. The multi-station system of claim 8 wherein: each of said building site units transmits to said system control center from said third transceiver on a predetermined periodic basis.

10. The multi-station system of claim 1 wherein: said second transceiver at each of said building site units includes a narrow pulse deleter to block as invalid any bit having a width less than a predetermined value.

11. The multi-station system of claim 2 wherein: said second transceiver at each of said building site units includes a narrow pulse deleter to block as invalid any bit having a width less than a predetermined value.

12. The multi-station system of claim 7 wherein: said second transceiver at each of said building site units includes a narrow pulse deleter to block as invalid any bit having a width less than a predetermined value.

13. The multi-station system of claim 8 wherein: said second transceiver at each of said building site units includes a narrow puise deleter to block as invalid any bit having a width less than a predetermined value.

14. The multi-station system of claim 9 wherein: said second transceiver at each of said building site units includes a narrow pulse deleter to block as invalid any bit having a width less than a predetermined value.

* * * * *